United States Patent
Scalzo et al.

(10) Patent No.: US 11,097,343 B2
(45) Date of Patent: Aug. 24, 2021

(54) METHOD OF FORMING A COMPONENT FROM A GREEN PART

(71) Applicant: PRATT & WHITNEY CANADA CORP., Longueuil (CA)

(72) Inventors: Orlando Scalzo, Montreal (CA); Marc Lorenzo Campomanes, Longueuil (CA); Guillaume Poitras, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 45 days.

(21) Appl. No.: 16/382,481

(22) Filed: Apr. 12, 2019

(65) Prior Publication Data
US 2019/0232373 A1    Aug. 1, 2019

Related U.S. Application Data

(63) Continuation of application No. 14/656,342, filed on Mar. 12, 2015, now abandoned.

(51) Int. Cl.
*B22F 3/22*      (2006.01)
*B22F 3/10*      (2006.01)
(Continued)

(52) U.S. Cl.
CPC .............. *B22F 3/225* (2013.01); *B22F 3/105* (2013.01); *B22F 3/1021* (2013.01); *B22F 5/009* (2013.01);
(Continued)

(58) Field of Classification Search
CPC ............ B22F 2003/023; B22F 2999/00; B22F 3/225; B22F 2207/01; B22F 3/02;
(Continued)

(56) References Cited

U.S. PATENT DOCUMENTS 3,742,182 A    6/1973 Saunders
3,879,509 A *  4/1975 Elderbaum .......... C04B 35/111
                                                419/9
(Continued)

FOREIGN PATENT DOCUMENTS

CA    2643568    9/2007
CA    2588626    11/2008
(Continued)

OTHER PUBLICATIONS

Heaney, D.F. "special metal injection molding processes, part III". 2012. Handbook of metal injection molding, p. 307-390. (Year: 2012).*

(Continued)

*Primary Examiner* — Nicholas A Wang
(74) *Attorney, Agent, or Firm* — Norton Rose Fulbright Canada LLP (57) ABSTRACT

A method of forming a component from a part in the green state, including selecting at least one first portion of the part to undergo a different local volume reduction from at least one second portion to obtain the component. The green part is provided with the first portion(s) having a first solid loading and the second portion(s) having a second solid loading different from the first solid loading, then debound and sintered to obtain the component. The different first and second solid loadings produce the different local volume reduction in the first portion(s). The first portion(s) can be selected by determining a resulting final shape obtained from debinding and sintering a green part having a uniform first volumetric proportion of binder, and selecting the first portion(s) requiring a different local deformation than that producing the resulting final shape to obtain a desired final shape.

18 Claims, 7 Drawing Sheets

(51) Int. Cl.
*B22F 7/02* (2006.01)
*B22F 7/06* (2006.01)
*F01D 9/04* (2006.01)
*F01D 25/24* (2006.01)
*B22F 3/105* (2006.01)
*B22F 5/00* (2006.01)
*B22F 3/02* (2006.01)

(52) U.S. Cl.
CPC ............ *B22F 7/02* (2013.01); *B22F 7/06* (2013.01); *F01D 9/04* (2013.01); *F01D 25/246* (2013.01); *B22F 3/02* (2013.01); *B22F 2003/023* (2013.01); *B22F 2999/00* (2013.01); *F05D 2230/22* (2013.01)

(58) Field of Classification Search
CPC ........ B22F 3/1021; B22F 3/105; B22F 5/009; B22F 7/02; B22F 7/06; F05D 2230/22
See application file for complete search history.

(56) References Cited

U.S. PATENT DOCUMENTS

| | | | |
|---|---|---|---|
| 4,886,639 A | 12/1989 | Andrees et al. | |
| 5,142,778 A | 9/1992 | Smolinski et al. | |
| 5,353,865 A | 10/1994 | Adiutori et al. | |
| 5,487,773 A | 1/1996 | Seyama et al. | |
| 5,689,796 A | 11/1997 | Kasai et al. | |
| 5,874,162 A * | 2/1999 | Bastian | C04B 35/111 428/210 |
| 6,262,150 B1 | 7/2001 | Behi et al. | |
| 6,403,020 B1 * | 6/2002 | Altoonian | B22C 9/12 264/234 |
| 6,640,604 B2 | 11/2003 | Matsushita | |
| 6,808,010 B2 * | 10/2004 | Dixon | B22C 9/12 164/369 |
| 6,935,022 B2 | 8/2005 | German et al. | |
| 7,246,993 B2 | 7/2007 | Bolms et al. | |
| 7,413,702 B2 | 8/2008 | Lu et al. | |
| 7,534,086 B2 | 5/2009 | Mazzola et al. | |
| 7,597,533 B1 | 10/2009 | Liang | |
| 7,726,936 B2 | 6/2010 | Keller et al. | |
| 8,316,541 B2 | 11/2012 | Patel et al. | |
| 8,596,963 B1 | 12/2013 | Liang | |
| 9,517,507 B2 | 12/2016 | Campomanes et al. | |
| 9,903,275 B2 | 2/2018 | Campomanes et al. | |
| 2002/0037232 A1 | 3/2002 | Billiet et al. | |
| 2002/0098298 A1 | 7/2002 | Bolton et al. | |
| 2002/0129925 A1 | 9/2002 | Dixon et al. | |
| 2004/0217524 A1 | 11/2004 | Morris | |
| 2005/0019199 A1 | 1/2005 | Quinfa et al. | |
| 2006/0163774 A1 | 7/2006 | Abels et al. | |
| 2007/0202000 A1 * | 8/2007 | Andrees | B22F 5/009 419/5 |
| 2008/0075619 A1 | 3/2008 | Hosamani et al. | |
| 2008/0213718 A1 * | 9/2008 | Abels | A61C 7/14 433/8 |
| 2008/0237403 A1 | 10/2008 | Kelly et al. | |
| 2009/0304497 A1 | 12/2009 | Meier et al. | |
| 2010/0236688 A1 | 9/2010 | Scalzo et al. | |
| 2011/0016717 A1 | 1/2011 | Morrison et al. | |
| 2012/0000072 A9 | 1/2012 | Morrison et al. | |
| 2012/0136400 A1 | 5/2012 | Julien et al. | |
| 2013/0031909 A1 | 2/2013 | Patel et al. | |
| 2013/0051979 A1 | 2/2013 | Durocher et al. | |
| 2013/0052007 A1 | 2/2013 | Durocher et al. | |
| 2013/0052074 A1 | 2/2013 | Durocher et al. | |
| 2013/0156626 A1 | 6/2013 | Roth-Fagaraseanu et al. | |
| 2013/0259732 A1 | 10/2013 | Alexander et al. | |
| 2015/0093281 A1 | 4/2015 | Campomanes et al. | |

FOREIGN PATENT DOCUMENTS

| | | | |
|---|---|---|---|
| DE | 102012206087 | | 10/2013 |
| EP | 0538073 | | 4/1993 |
| EP | 1033193 | | 12/2004 |
| EP | 1876336 | | 1/2008 |
| EP | 2230384 | | 9/2010 |
| EP | 2372087 | | 10/2011 |
| GB | 2448031 | | 10/2008 |
| RU | 2255995 | | 7/2005 |
| WO | 0245889 | | 6/2002 |
| WO | WO2016010556 | * | 1/2016 |

OTHER PUBLICATIONS

T. Hong, W. Ju, M. Wu. "Rapid Prototyping of PMMA microfluidic chips utilizing a CO2 laser." Microfluid Nanofluid (2010) 9: 1125-1133.

Dearden G et al, Review Article, Some recent developments in two- and three-dimensional laser forming for 'macro' and 'micro' applications, Journal of optics A, pure and applied Optics, Institute of Physics publishing, Bristol, GB, vol. 5, No. 4, Jun. 25, 2003, pp. S8-S15.

G. Kibria, B. Doloi, B. Bhattacharyya. S.N. Joshi and U.S. Dixit (edts.), Laser Based Manufacturing, Topics in Mining, Metallurgy and Materials Engineering, 2015, pp. 343-380.

Ray, Laser machining and its thermal effects on silicon nitride and steel, Iowa State University Respective Theses and Dissertations, 2015, pp. 1-143.

"Carbon dioxide (CO2) and ND YAG laser systems". Laser Technology. http://www.inkcups.com/articles/co2-and-yag-laser-technology/Default.aspx. Published Oct. 3, 2008. (Year: 2008).

Heaney, D. F. (Ed.). (2012). Handbook of metal injection molding.

* cited by examiner

METHOD OF FORMING A COMPONENT FROM A GREEN PART

CROSS-REFERENCE TO RELATED APPLICATION

The present application is a continuation of U.S. patent application Ser. No. 14/656,342, filed Mar. 12, 2015, the entire contents of which is incorporated by reference herein.

TECHNICAL FIELD

The application relates generally to the manufacturing of components from green parts and, more particularly, to powder injection molding processes.

BACKGROUND OF THE ART

When manufacturing complex parts using powder injection molding, the volume reduction of the part occurring during sintering is often anisotropic, i.e. the deformations caused by the volume reduction are often more important in one direction when compared to the other. Accordingly, the shape of the part may change during sintering, which may prevent parts from being manufactured within tight dimensional tolerances.

Moreover, some gas turbine engine panel components, such as for example some combustor heat shield panels, may have features which are relatively hard to mold. Such features may include, for example, a curved shape, angled retention elements and/or angled cooling holes. Accordingly, manufacturing these components using a molding process while being able to easily remove the component from the mold cavity may require the use of a mold with a complex configuration, which may render the use of a molding process such as powder injection molding to manufacture these components undesirable and/or impractical.

SUMMARY

In one aspect, there is provided a method of forming a component from a part in a green state, the method comprising: selecting at least one first portion of the part to undergo a different local volume reduction from at least one second portion of the part to obtain the component; providing the part in the green state including: the at least one first portion having a first volume of powder material $V_{P1}$ and a first volume of binder $V_{B1}$, the at least one first portion having a first solid loading defined as $V_{P1}/(V_{P1}+V_{B1})$, and the at least one second portion having a second volume of powder material at least one second portion $V_{P2}$ and a second volume of binder $V_{B2}$, the at least one second portion having a second solid loading defined as $V_{P2}/(V_{P2}+V_{B2})$, the first and second solid loadings having different values from one another; and debinding and sintering the part to obtain the component, the different values of the first and second solid loadings producing the different local volume reduction in the at least one first portion with respect to the at least one second portion.

In another aspect, there is provided a method of forming a component using powder injection molding, the method comprising: determining a resulting final shape obtained from debinding and sintering a green part having a uniform first volumetric proportion of binder; selecting at least one first portion of the green part requiring a different local deformation than that producing the resulting final shape to obtain a desired final shape; providing the green part with the at least one first portion including a second volumetric proportion of binder different from the first volumetric proportion of binder, the green part including at least one second portion having the first volumetric proportion of binder; and debinding and sintering the part to obtain the component with the desired final shape.

DESCRIPTION OF THE DRAWINGS

Reference is now made to the accompanying figures in which.

DETAILED DESCRIPTION

Figure 1:
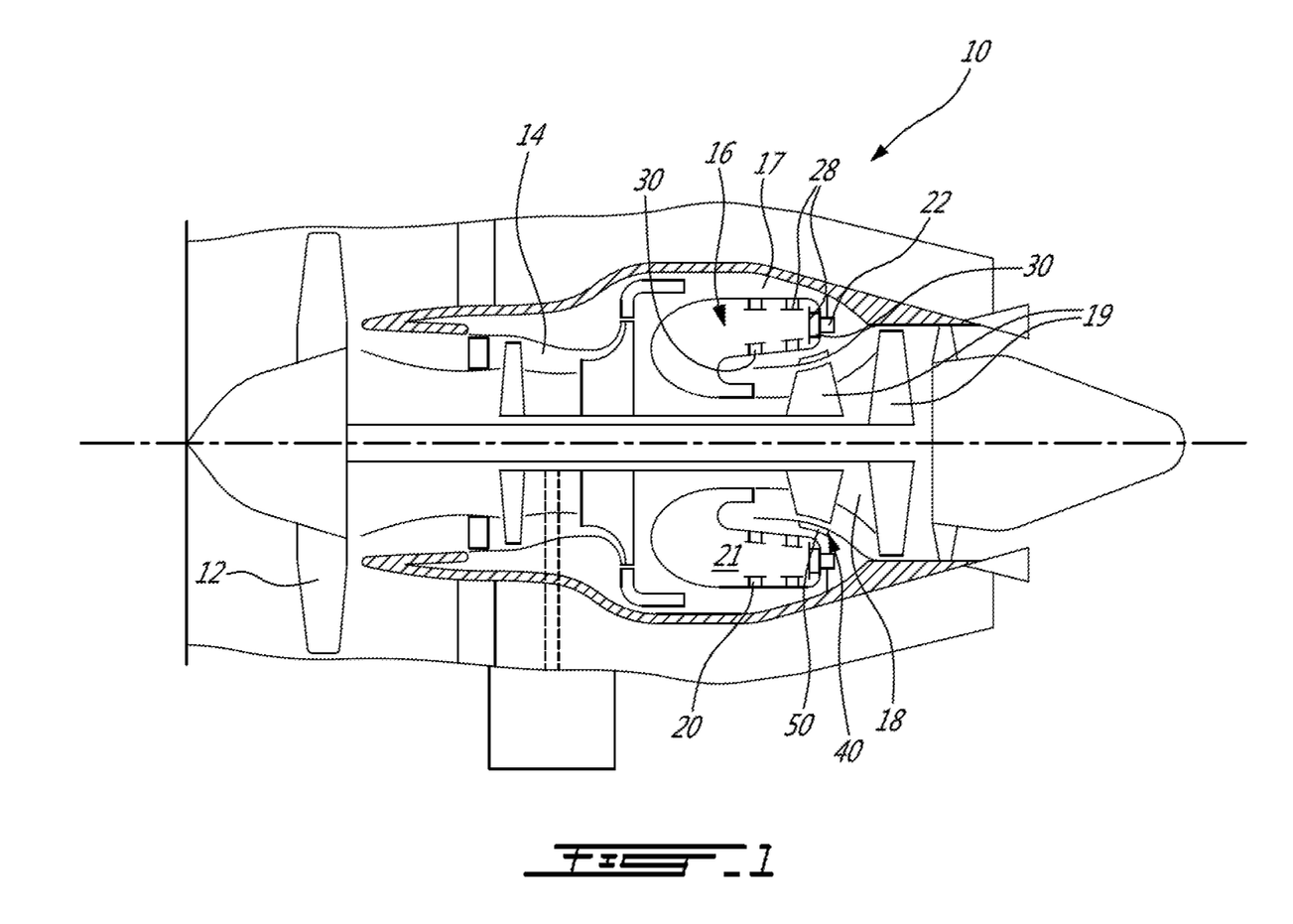
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor section 14. The combustor 16 typically comprises a combustor shell 20 defining a combustion chamber 21 and a plurality of fuel nozzles 22 for atomizing fuel, which are typically equally circumferentially distributed on the dome end panel of the combustor shell 20 in order to permit a substantially uniform temperature distribution in the combustion chamber 21 to be maintained. The combustor shell 20 is typically made out from sheet metal.

Annular rows of circumferentially segmented heat shield panels 28 are mounted to the inner surface of the combustor shell 20 to thermally shield the same. Each row of heat shield panels 28 may cover the full circumference of the combustor shell 20. As shown in FIG. 1, some of the heat shield panels 28 may be mounted to the dome panel of the combustor shell 20 and others to the axially projecting portions of the combustor shell 20. Depending on the intended application, the heat shield panels 28 may fully cover the inner surface of the combustor shell 20 from the dome end to the opposed discharged end of the combustor. Alternatively, the heat shield panels may be only provided on specific portions, such as the dome end wall, of the combustor shell 20.

The heat shield panels 28 have cold side surfaces or back surfaces which are spaced from the inner surface of the combustor shell 20 to define a back cooling space 30 such that cooling air may circulate therethrough to cool the heat shield panels 28. Holes are typically defined in the combustor shell 20 to allow cooling air to flow from the plenum 17 to the back cooling space 30 between the heat shield panels 28 and the combustor shell 20.

The turbine section 18 generally comprises one or more stages of rotor blades 19 extending radially outwardly from respective rotor disks, with the blade tips being disposed closely adjacent to a stationary annular turbine shroud 40 supported from the engine casing. In a particular embodiment, the turbine shroud 40 is segmented in the circumferential direction and accordingly includes a plurality of similar or identical circumferentially adjoining shroud segments 50 together defining the annular turbine shroud 40. The turbine shroud 40 defines a portion of the radially outer boundary of the engine gas path. In a particular embodiment, each shroud segment 50 is individually supported and located within the engine 10 by an outer housing support structure (not shown).

There is described herein a method of forming a component from a green part, where different areas of the green part have different solid loadings (different proportions of binder/powder material). In a particular embodiment, such variations in solid loading results in a desired distribution of local deformations during the sintering process, for example to correct an anisotropic shrink otherwise obtained with a uniform solid loading, or to deform the part from an initial shape of the green part to a desired final shape of the component. Although exemplary components are provided herein as components of the gas turbine engine 10, it is understood that the methods described also apply to other types of components.

The green part is made from one or more appropriate type(s) of feedstock, and obtained for example by powder or metal injection molding. The feedstock is a mixture of a material powder and of a binder which may include one or more binding material(s). Examples of possible powder materials include high temperature resistant powder metal alloys, such as a cobalt alloy or nickel-based superalloy, or ceramic, glass, carbide or composite powders or mixtures thereof, mixed with an appropriate binder. Other high temperature resistant material powders which may include one material or a mix of materials could be used as well. In a particular embodiment, the binder includes an organic material which is molten above room temperature (20° C.) but solid or substantially solid at room temperature. The binder may include various components such as surfactants which are known to assist the injection of the feedstock into mold for production of the green part. In a particular embodiment, the binder includes a mixture of binding materials, for example including a lower melting temperature polymer, such as a polymer having a melting temperature below 100° C. (e.g. paraffin wax, polyethylene glycol, microcrystalline wax) and a higher melting temperature polymer or polymers, such as a polymer or polymers having a melting temperature above 100° C. (e.g. polypropylene, polyethylene, polystyrene, polyvinyl chloride). "Green state" or "green part" as discussed herein refers to a molded part produced by the solidified binder that holds the powder material together.

In a particular embodiment, the powder material is mixed with the molten binder and the suspension of injection powder and binder is injected into a mold cavity and cooled to a temperature below that of the melting point of the binder. Alternately, the feedstock is in particulate form and is injected into the mold cavity of the heated mold where the binder melts, and the mold is then cooled until the binder solidifies. Use of other processes to create the green part is also possible.

Figure 2:
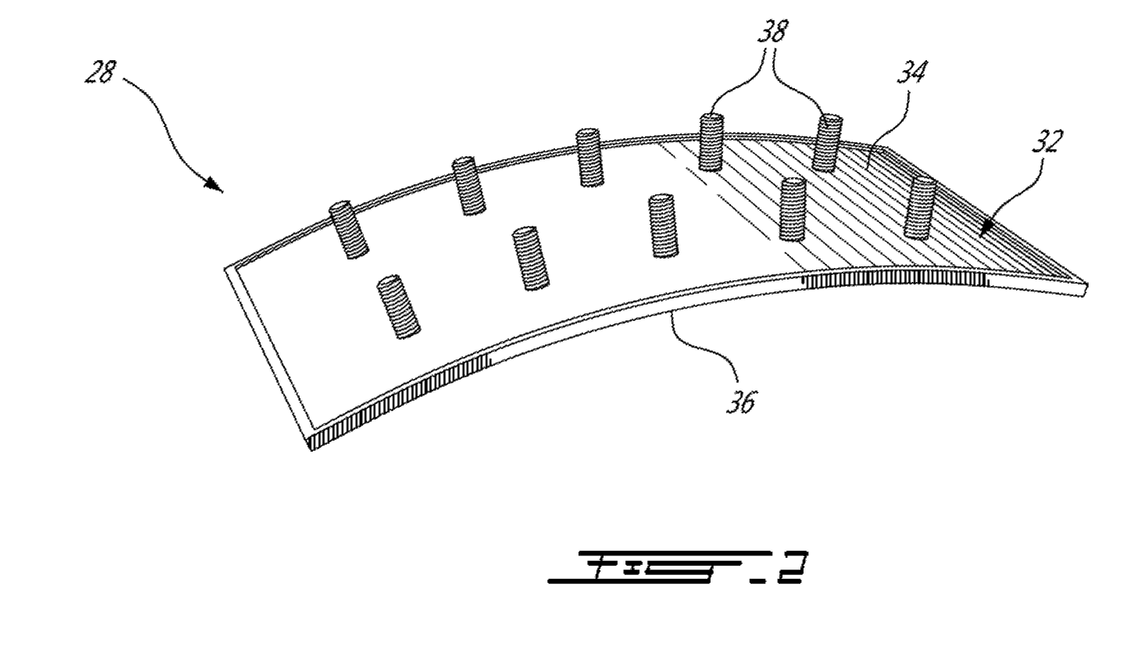
FIG. 2 is a schematic tridimensional view of a heat shield panel in accordance with a particular embodiment, which may be used in a gas turbine engine such as shown in FIG. 1.

In a particular embodiment, the component(s) manufactured from green part(s) as discussed above include the heat shield panels 28, an exemplary construction of which is shown in FIG. 2. Each heat shield panel 28 has a platform section 32 having opposed cold and hot facing sides 34 and 36, and cold side details extending from the cold facing side 34 of the platform section 32. According to the illustrated embodiment, the cold side details include retaining elements in the form of threaded studs 38. Alternate possible cold side details include, but are not limited to, various types of elongated features such as heat exchange promoting structures, rails, bosses, divider walls, ribs, pin fins, etc.

The threaded studs 38 are used to retain the heat shield panel 28 in place, and in a particular embodiment protrude through holes defined in the combustor shell 20 and are threadingly engaged to fasteners, such as for example self-locking nuts, from outside of the combustor shell 20. Other types of retaining elements may alternately be used.

A thermal barrier coating, such as a ceramic coating (TBC), may be applied to the hot facing side 36 of the platform section 32. Holes, such as effusion holes and dilution holes (not shown), may be defined through the platform section 32. The effusion holes allow the cooling air to flow from the back cooling space 30 to the front or hot facing side 36 of the heat shield panels 28.

In the embodiment shown, both the cold and hot facing sides 34 and 36 have a curved shape, more particularly an arcuate shape corresponding to an arcuate portion of a cylinder. Other types of curved shapes can also be used depending on the configuration of the surface to be protected by the heat shield panel 28, including, but not limited to, a shape corresponding to part of a cone, a sphere, or a toroid.

Figure 3A:
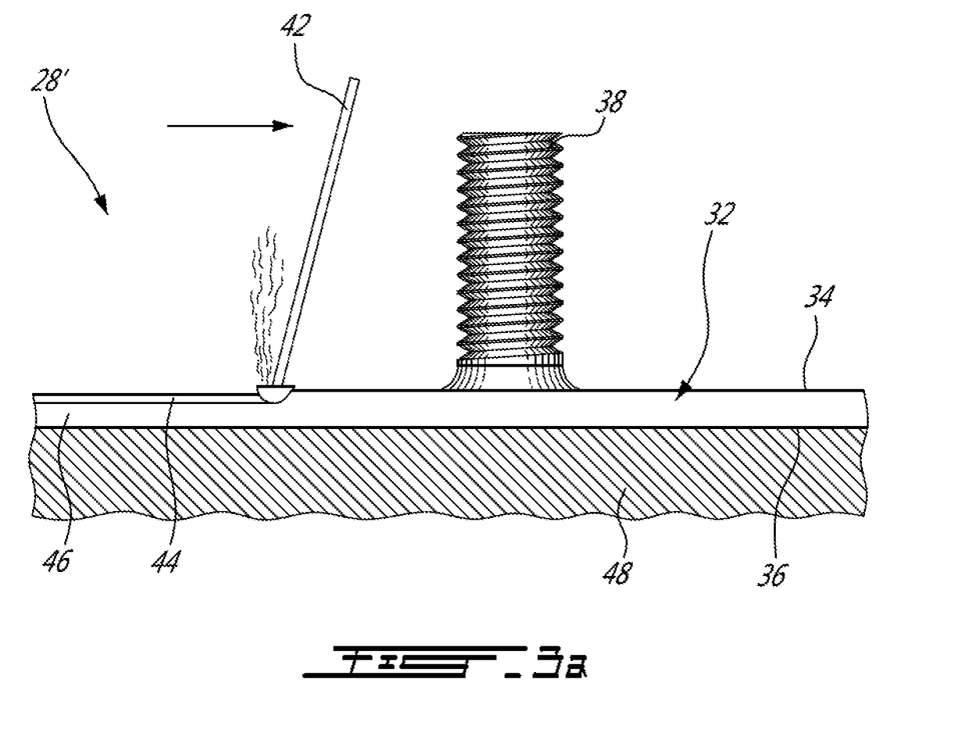
FIG. 3a is a schematic side view of a section of a green part used to form the heat shield panel of FIG. 2, in accordance with a particular embodiment.
Figure 3B:
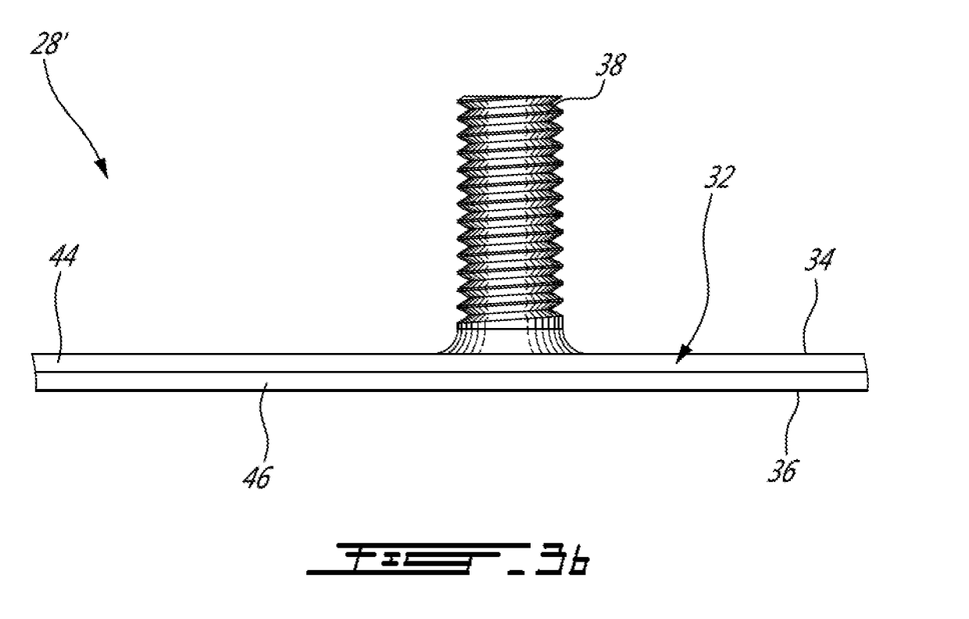
FIG. 3b is a schematic side view of a section of a green part used to form the heat shield panel of FIG. 2, in accordance with another particular embodiment.

In a particular embodiment, the heat shield panel 28 is obtained from a green part having an initial shape which is different from the final desired shape of the heat shield panel 28. The initial shape is selected such as to be able to reach the final shape through deformation, and such as to be easier to mold than the final shape. For example, the initial shape corresponds to a mold cavity and mold configuration having a reduced degree of complexity with respect to that which would be required to mold the heat shield panel 28 directly in its final shape. In a particular embodiment and as shown in FIGS. 3a-3b, the green part 28' defining the heat shield panel 28 is formed with its platform section 32 having a planar configuration and with the studs 38 extending perpendicularly with respect to the planar platform section 32. The studs 38 of the green part 28' thus each extend along a respective axis, with the axes being parallel to one another.

At least one portion of the green part 28' is selected to undergo a different local volume reduction than another portion of the green part 28' during the sintering process, in order to obtain the final shape of the component. In the embodiment shown, the curved final shape is achieved by having the platform section 32 of the green part 28' composed of two superposed layers 44, 46 each defining one of the cold and hot facing sides 34, 36, with the layer 46 defining the hot facing side 36 undergoing a greater volume reduction than the layer 44 defining the cold facing side 34; the difference in volume reduction between the two connected layers 44, 46 causes the platform section 32 to curve during the sintering process to reach the desired final shape, as will be further described below.

The green part 28' is formed with the layer 44 on the cold facing side 34 having a first volume of powder material $V_{P1}$ and a first volume of binder $V_{B1}$, defining a solid loading of $V_{P1}/(V_{P1}+V_{B1})$, and a corresponding volumetric proportion of binder of $V_{B1}/(V_{P1}+V_{B1})$, and with the layer 46 of the hot facing side 36 having a second volume of powder material $V_{P2}$ and a second volume of binder $V_{B2}$, defining a solid loading defined as $V_{P2}/(V_{P2}+V_{B2})$, and a corresponding volumetric proportion of binder of $V_{B2}/(V_{P2}+V_{B2})$. In order to obtain the greater volume reduction in the layer 46 defining the hot facing side 36, the solid loading of that layer 46 is selected to be smaller than the solid loading in the layer 44 defining the cold facing side 34. In other words, the volumetric proportion of binder in the layer 46 defining the hot facing side 36 is larger than the volumetric proportion of binder in the layer 44 defining the cold facing side 34.

In a particular embodiment, and with reference to FIG. 3a, the green part 28' is entirely formed (e.g. molded) from a feedstock having the desired solid loading of the layer 46 defining the hot facing side 36. The greater solid loading of the layer 44 defining the cold facing side 34 is obtained by locally heating that layer 44 to vaporize part of the binder therein, until the desired solid loading is reached. The layer 44 defining the cold facing side 34 is locally heated at a temperature equal to or higher than the vaporization temperature of the binder, but lower than the sintering temperature of the powder material to avoid sintering. In a particular embodiment the layer 44 is heated to a temperature equal to or above the vaporization temperature of one or more polymer(s) present in the binder but below the vaporization temperature of one or more other polymer(s) in the binder, such as to vaporize only some of the components of the binder. Accordingly, the higher vaporizing temperature polymer(s) in the binder remain present.

In the embodiment shown, the layer 44 is locally heated using a laser beam 42, which may be defocussed and/or moved (e.g. wobbled) to limit the temperature increase in the layer 44. Alternate local heating tools may be used, including, but not limited to, a heat gun, white light, any other appropriate type of radiation and/or method of heat transfer. The layer 46 defining the hot facing side 36 is supported on a setter 48 during the heating process. The setter 48 may be made of a material acting as a heat sink, and may include cooling passages for circulation of a coolant (e.g. water) therethrough.

In another embodiment, and with reference to FIG. 3b, the green part 28' is formed (e.g. molded) by forming the two layers 44, 46 from different feedstocks having the desired solid loadings. The layers 44, 46 may be co-molded, or formed separately and assembled in the green state.

The green part forming the heat shield panel 28' is then submitted to a debinding operation to remove most or all of the binder. The green part 28' can be debound using various debinding solutions and/or heat treatments known in the art, to obtain a brown part 28". Debinding may be done in shape-retaining conditions (e.g. with the part being supported in alumina powder) and accordingly in a particular embodiment, the part does not substantially deform during the debinding process.

Figure 4A:
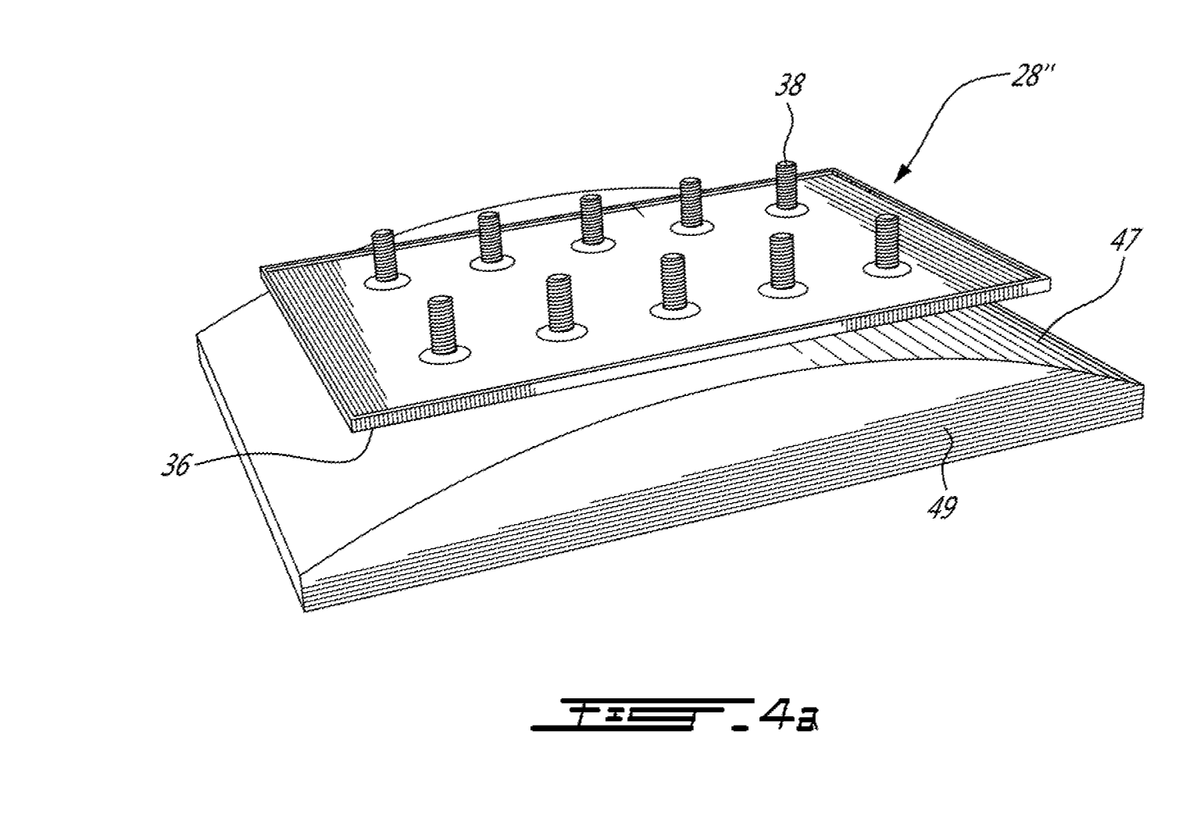
FIG. 4a is a schematic tridimensional view of the green part of FIG. 3a or FIG. 3b at the beginning of sintering, in accordance with a particular embodiment.

Referring to FIG. 4a, the brown part 28" forming the heat shield panel 28 is placed against a setter 49 and sintered. The surface of the hot facing side 36 is put into contact with a shaping surface 47 of the setter 49; the surface of the hot facing side 36 has an initial shape which does not conform to the shaping surface 47. The shaping surface 47 corresponds to the final shape which is desired for the surface of the hot facing side 36. The smaller proportion of powder material in the layer 46 defining the hot facing side 36 creates a greater volumetric reduction is that layer 46 during the sintering process, when compared to the layer 44 defining the cold facing side 34. The platform section 32 thus curves toward the setter 49 during the sintering process until the surface of the hot facing side 36 conforms to the shaping surface 47, as shown in FIG. 4b.

The sintering operation can be done in air, an inert gas environment, a reducing atmosphere ($H_2$ for example), or a vacuum environment depending on the composition of material to be obtained. In a particular embodiment, sintering is followed by a heat treatment also defined by the requirements of the material of the finished part. In some cases, it may be followed with hot isostatic pressing (HIP). Coining may also be performed to further refine the profile of the part. It is understood that the parameters of the sintering operation can vary depending on the composition of the feedstock, on the method of debinding and on the configuration of the part.

Figure 4B:
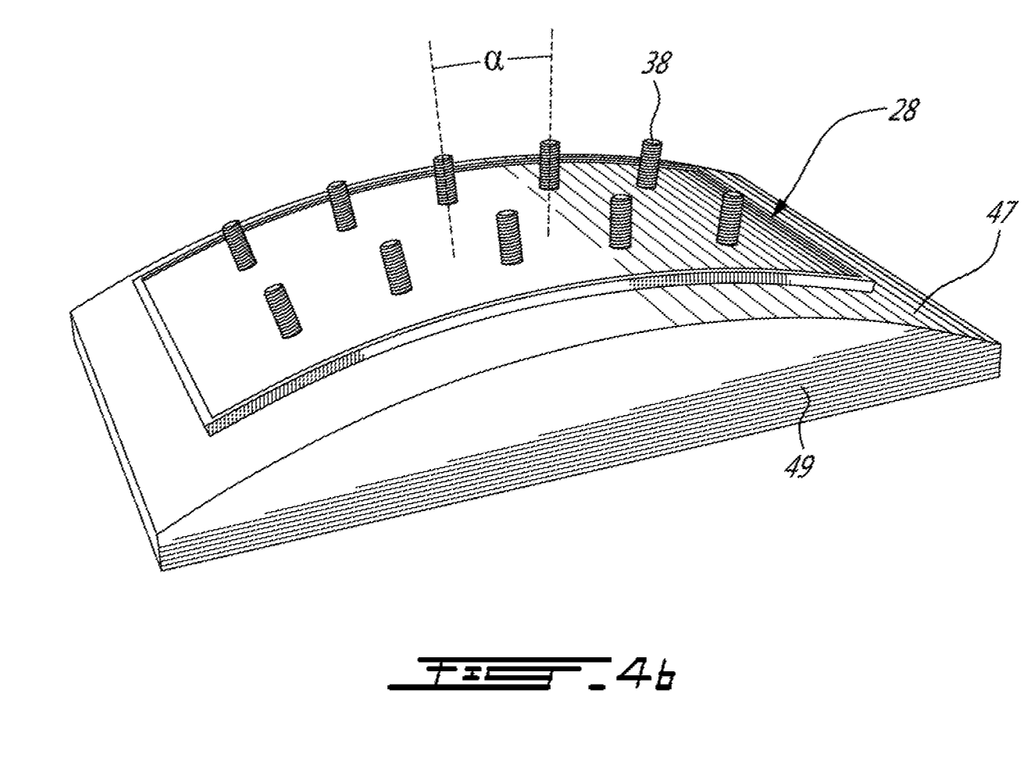
FIG. 4b is a schematic tridimensional view of the green part of FIG. 3a or FIG. 3b after sintering, in accordance with a particular embodiment.

From FIGS. 4a-4b, it can be seen that the deformation of the platform section 32 changes the relative orientation of the studs 38; the angle between the respective stud axes changes as the platform section 32 deforms to reach the final desired angle α (i.e. the angle desired in the final shape of the part) once the surface of the hot facing side 36 conforms to the shaping surface 47. Accordingly, the studs 38 may be molded as extending parallel to each other and have an angled orientation with respect to one another once the heat shield panel 28 reaches its final shape. In a particular embodiment, this allows for the use of mold cavities and mold structures having a simpler shape, which may be easier and/or less expensive to configure. In a particular embodiment, the platform section 32 is deformed to create an undercut or cavity not defined during the molding of the platform section 32, thus avoiding the use of a sacrificial element or other insert in the mold.

Although the heat shield panel 28 has been shown with the platform section 32 being molded in a planar configuration, it is understood that in another embodiment, the heat shield panel 28 may be molded with a curved configuration different from the final desired shape, and deformed to the final desired shape as described above.

Figure 5:
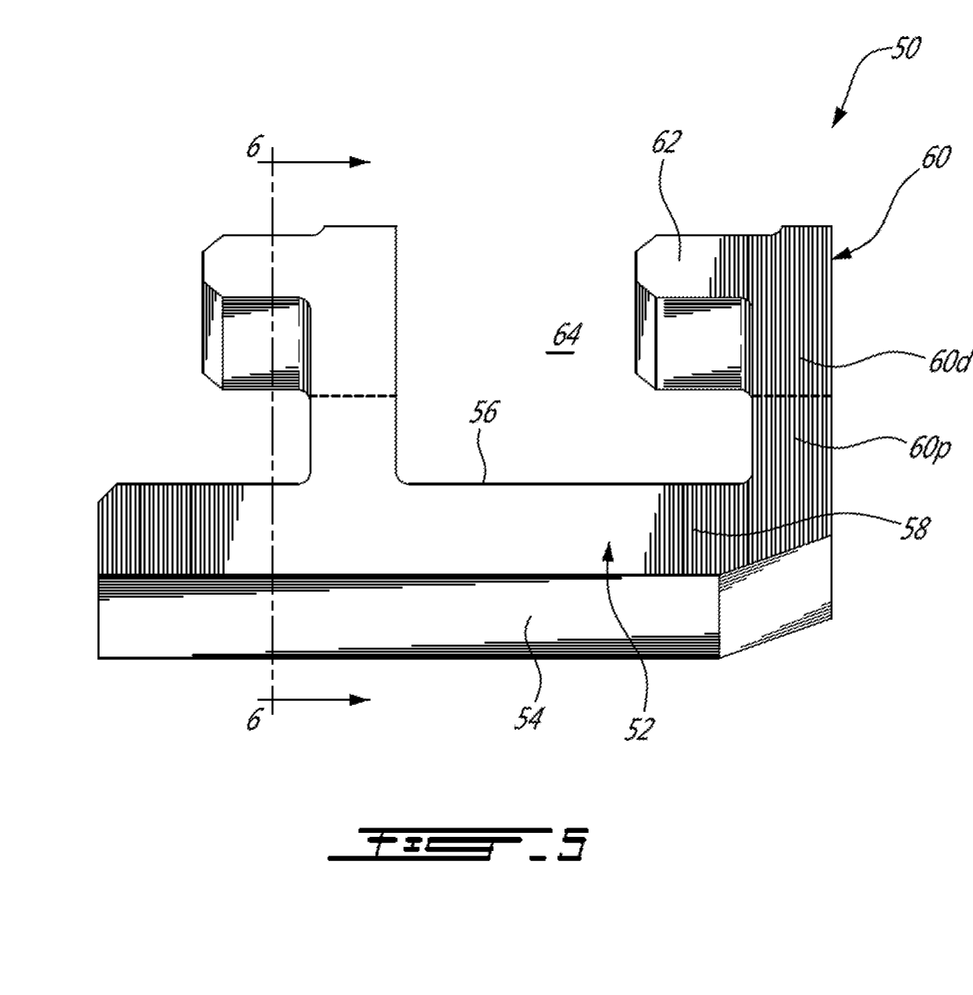
FIG. 5 is a schematic side view of a shroud segment in accordance with a particular embodiment, which may be used in a gas turbine engine such as shown in FIG. 1.
Figure 6:
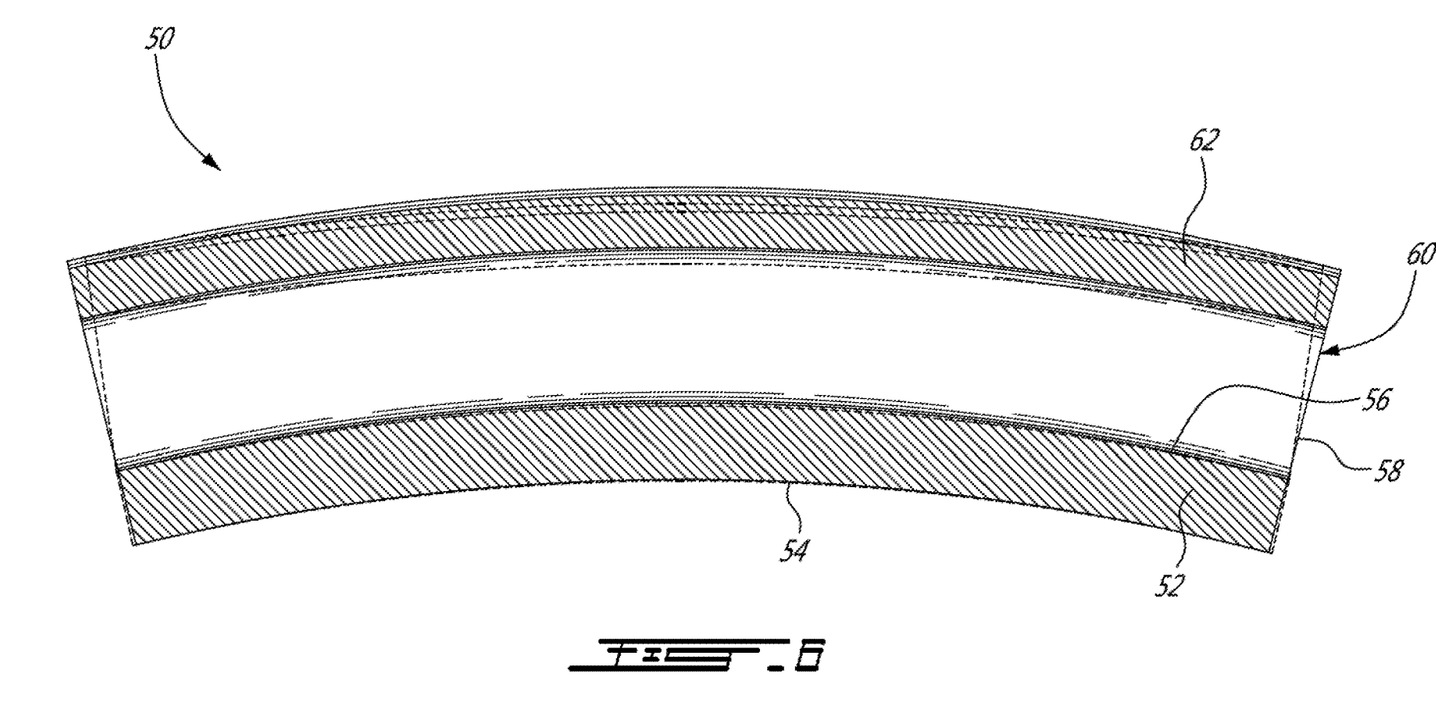
FIG. 6 is a schematic cross-sectional view of the shroud segment of FIG. 5 taken along lines 6-6 thereof, showing a comparison between a shape obtained from a green part with a uniform solid loading and a shape obtained from a green part with portions having different solid loadings.

Referring to FIGS. 5-6, in another particular embodiment, the component(s) manufactured from green part(s) as discussed above include the turbine shroud segments 50 forming part of the turbine shroud 40.

The shroud segment 50 includes an arcuate platform 52 having an inner gas path surface 54 which is adapted to be exposed to the hot combustion gases during engine operation and an opposed outer cold surface 56. The platform 52 extends between circumferentially opposed ends 58 which mate with the circumferential end of the abutting shroud segments to form the shroud. Axially spaced-apart front and rear legs 60 extend radially outwardly from the outer surface 56 of the platform 52. The legs 60 are each provided with a respective axially projecting hook or rail portion 62 for engagement with corresponding mounting flange projections of the surrounding support structure in the engine. When assembled in the engine, a shroud plenum 64 is defined between the legs 60 and between the outer surface 56 of the platform 52 and the support structure, for receiving cooling air from a cooling air source, for example bleed air from the compressor section 14. It is understood that the retention elements formed by the legs 60 and hook portions 62 are shown as an example only and can be replaced by any other appropriate type of retention elements.

Although not shown, various recesses or slots may be defined in the shroud segment 50, for example for receiving sealing members therein, including, but not limited to, radially extending slots in the legs 60, in the side of the legs facing the plenum 64, and/or in the circumferential ends 58 of the platform. Other features may be provided in the shroud segment 50, including, but not limited to, cooling holes and passages, angular timing features, pockets, and platforms.

The shroud segment 50 is manufactured from a green part, obtained for example by powder injection molding, using similar materials and processes as those described above for the heat shield panel 28 and which accordingly will not be repeated herein. A variety of removable and/or sacrificial inserts can be used in the molding process to define the internal features such as cooling passages.

At least one portion of the green part is selected to undergo a different local volume reduction than another portion of the green part during the sintering process, in order to obtain a desired final shape. In a particular embodiment and with reference to FIG. 6, the desired final shape (in solid lines) is compared with the shape obtained after sintering when the green part is produced with a uniform solid loading (in dotted lines). It can be seen that for this exemplary shroud segment 50, the shrink or volume reduction occurring during the sintering process is anisotropic: the volume reduction is greater in the legs 60 than in the platform 52, causing the part to deform away from the desired shape. The portion(s) of the shroud segment 50 which deviate(s) from the desired shape by more than a predetermined threshold are thus selected to undergo a different local volume reduction through a change in solid loading, in order to change the local deformation produced during sintering.

In the embodiment shown, the part of the retention elements formed by the distal part 60d of each leg 60 and the associated hook portion 62 is thus selected to undergo a smaller volume reduction than the remainder of the shroud segment, to reduce or minimize the shape distortion created during the sintering process. The green part is thus formed with the distal part 60d of each leg 60 and the hook portions 62 having a solid loading greater than the remainder of the shroud segment (platform 52 and proximal part 60p of each leg 60). In other words, the volumetric proportion of binder in the distal part 60d of each leg 60 and in the hook portions 62 is smaller than the volumetric proportion of binder in the platform 52 and in the proximal part 60p of each leg 60.

In a particular embodiment, the green part is formed (e.g. molded) by forming the distal part 60d of each leg 60 and the hook portions 62 with a different feedstock from that used to form the platform 52 and proximal part 60p of each leg 60, the two feedstocks having the desired different solid loadings. The portions made from different feedstocks may be co-molded, or formed separately and assembled in the green state. Although the transition between the two portions is shown here as a plane, it is understood that the transition may have any other appropriate shape, including, but not limited to, dovetail, tongue-and-groove, mortise and tenon, dowel and pin, zig-zag, or any other shape where the two portions define one or more complementary engagement member(s) engaged with one another.

The green shroud segment is then submitted to debinding and sintering, as discussed above.

It is understood that the heat shield 28 and shroud segment 50 shown herein are exemplary embodiments and that the component may alternately be any other component manufactured from a powder injection molding process or any other process creating an intermediary green part, i.e. a part including a solidified binder that holds a material powder together with the binder being removed before the part is in its final form. Examples of such components include, but are not limited to, vane segments, vane rings, heat shields and other combustor components, fuel nozzle portions, arcuate shroud plates, folded brackets having a configuration which may be otherwise obtained through sheet metal folding, and components other than gas turbine engine components. Examples of component features which may be produced as extending at an initial angle in the green state and which may reach an orientation defined by a different angle after sintering, as discussed above, include, but are not limited to, attachment members, pins, fins, rails, ribs, walls, bosses, bumps, dents, etc. extending from the component and/or cooling holes or other apertures defined therein or therethrough.

In any embodiment, the possible range of variations in solid loading between portions of the component is dictated by the minimum and maximum possible solid loading for the particular feedstock used: the solid loading in all portions must be sufficiently high for the green part to be able to maintain its shape, and sufficiently low for the feedstock to be shapable to create the green part, for example to be injectable in the case of powder injection molding. The determination of minimum and maximum possible solid loading values for a particular feedstock is within the knowledge of the person of ordinary skill and will not be detailed herein. In a particular embodiment, the difference between the values of the solid loading in the portions of the component is at least 0.01 and/or at most 0.06; in a particular embodiment, the difference is at least 0.01 and/or at most 0.1. Other values may also be possible.

In any embodiment where the green part is formed (e.g. molded) from different feedstocks having different solid loadings, the two feedstocks can be made from the same materials, i.e. same powder material and same binder, or alternately, may include different materials, particularly different materials having similar requirements (temperature, time) for sintering.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of forming a jointless part of a gas turbine engine through a powder injection molding process, the method comprising:
   forming a green body of the jointless part in an initial shape, including:
   injection-molding at least one first sub-region of the green body with a first feedstock,
   injection-molding at least one second sub-region of the green body with a second feedstock, obtaining a gradient of volumetric proportion of binder within the green body; and obtaining a desired final shape of the jointless part different from the initial shape of the green body by altering the initial shape via debinding and sintering the green body, wherein the at least one second sub-region undergoes a volume reduction and a change of shape such that a desired distribution of local deformations is produced to obtain the jointless part having a different geometry and size than the green body; and wherein the at least one second sub-region of the green body defines a surface of a flat shield plate prior to debinding and sintering, the surface of the flat shield plate curving during sintering to obtain the desired final shape of the jointless part after sintering.

2. The method as defined in claim 1, wherein the gradient of volumetric proportion of binder prior to debinding and sintering the green body is provided by the first feedstock having a first volumetric proportion of binder and the second feedstock having a second volumetric proportion of binder different than the first volumetric proportion of binder.

3. The method as defined in claim 2, wherein sintering is performed with the surface defined by the at least one second sub-region of the green body placed against a shaping surface of a setter, the first surface not conforming to the shaping surface prior to sintering, the first volumetric proportion of binder being smaller than the second volumetric proportion of binder such that the at least one first sub-region undergoes a smaller local volume reduction than the at least one second sub-region during sintering to deform and conform the surface to the shaping surface of the setter.

4. The method as defined in claim 1, wherein the at least one first sub-region defines a retention element of the jointless part and the surface defined by the at least one second sub-region is configured to be in contact with hot gas circulating through the gas turbine engine.

5. The method as defined in claim 1, wherein the first and second feedstocks are made of a same binder and a same powder material.

6. The method as defined in claim 1, wherein the gradient of volumetric proportion of binder is obtained by vaporizing part of the binder in the at least one first sub-region to adjust the gradient of volumetric proportion of binder prior to debinding and sintering the green body.

7. The method as defined in claim 6, wherein vaporizing part of the binder includes heating the at least one first sub-region with a laser.

8. The method as defined in claim 1, wherein the first and second feedstocks have a same volumetric proportion of binder when they are being injection-molded, wherein the gradient of volumetric proportion of binder within the green body prior to debinding and sintering the green body is obtained by vaporizing part of the binder in the at least one first sub-region until the gradient of volumetric proportion of binder within the green body is reached.

9. A method of forming a finished part of a gas turbine engine from a joint free injection molded part in a green state, the injection molded part in the green state having an initial shape, the finished part having a desired final shape different than the initial shape, the method comprising:

selecting at least one first sub-region of the injection molded part to undergo a local volume reduction different than that of at least one second sub-region of the injection molded part to obtain the finished part having the desired final shape, providing the at least one first sub-region with a first volumetric proportion of binder, the at least one second sub-region having a second volumetric proportion of binder different from the first volumetric proportion of binder, wherein a variation of volumetric proportion of binder is obtained within the injection molded part in the green state, and debinding and sintering the injection molded part in the green state to obtain the finished part having the desired final shape, wherein the variation of volumetric proportion of binder of the injection molded part in the green state results in a desired distribution of the local volume reductions of the at least one first and second sub-regions to reach the desired final shape of the finished part after debinding and sintering, wherein the at least one second sub-region of the injection molded part in the preen state defines a surface of a flat shield plate prior to debinding and sintering, wherein debinding and sintering includes curving the surface of the flat shield plate to obtain the desired final shape of the finished part.

10. The method as defined in claim 9, wherein sintering is performed with the surface defined by the at least one second sub-region of the injection molded part in the green state placed against a shaping surface of a setter, the first surface not conforming to the shaping surface prior to sintering, the first volumetric proportion of binder being smaller than the second volumetric proportion of binder such that the at least one first sub-region undergoes a smaller local volume reduction than the at least one second sub-region during sintering to deform and conform the first surface to the shaping surface of the setter.

11. The method as defined in claim 9, wherein the at least one first sub-region defines a retention element of the finished part and the surface defined by the at least one second sub-region of the finished part is configured to be in contact with hot gas circulating through the gas turbine engine.

12. The method as defined in claim 9, wherein the first and second feedstocks are made of a same binder and a same powder material.

13. A method of forming a curved platform section of a heat shield for a gas turbine engine, comprising:

forming a green body in the form of a flat panel, including:
  injection-molding at least one first sub-region of the green body with a first feedstock, the at least one first sub-region defining a first surface of the flat panel, the first surface configured to receive a plurality of studs;
  injection-molding at least one second sub-region of the green body with a second feedstock having a greater volumetric proportion of binder than the first feedstock, the at least one second sub-region defining a second surface opposite the first surface, the second surface configured to be in contact with hot gas circulating through the gas turbine engine;

debinding and sintering the green body in the form of the flat panel, wherein a non-uniform deformation field is obtained across the green body in the form of the flat panel, the at least one second sub-region undergoing a greater shrink than the at least one first sub-region to curve the green body in the form of the flat panel during sintering and obtain the curved platform section of the heat shield after sintering.

14. The method as defined in claim 13, wherein sintering is performed with the second surface of the green body placed against a shaping surface of a setter, the second surface not conforming to the shaping surface prior to sintering, the at least one second sub-region deforming during sintering and conforming to the shaping surface of the setter after sintering.

15. The method as defined in claim 13, wherein the first and second feedstocks are made of a same binder and a same powder material.

16. The method as defined in claim 13, wherein the first feedstock has a first volumetric proportion of powder material and the second feedstock has a second volumetric proportion of powder material, a difference between the values of the first and second volumetric proportion of powder material is at least 0.01.

17. The method as defined in claim 13, wherein the first feedstock has a first volumetric proportion of powder material and the second feedstock has a second volumetric proportion of powder material, a difference between the values of the first and second volumetric proportion of powder material is at most 0.06.

18. The method as defined in claim 13, wherein the first feedstock has a first volumetric proportion of powder material and the second feedstock has a second volumetric proportion of powder material, a difference between the values of the first and second volumetric proportion of powder material is at most 0.1.

* * * * *